(No Model.)

J. W. HOAG.
TROLLEY FOR ELECTRIC RAILWAYS.

No. 539,516. Patented May 21, 1895.

WITNESSES:
Wm. H. Caufield, Jr.
Marcy J. Trusdell.

INVENTOR:
JOHN W. HOAG.
BY
Fred C. Fraentzel,
ATTORNEY

United States Patent Office.

JOHN W. HOAG, OF NEWARK, NEW JERSEY.

TROLLEY FOR ELECTRIC RAILWAYS.

SPECIFICATION forming part of Letters Patent No. 539,516, dated May 21, 1895.

Application filed January 19, 1895. Serial No. 535,452. (No model.)

*To all whom it may concern:*

Be it known that I, JOHN W. HOAG, a citizen of the United States, residing at Newark, in the county of Essex and State of New Jersey, have invented certain new and useful Improvements in Trolleys for Electric Railways; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention relates to improvements in trolleys for electric railways, and has for its object to provide a trolley carrier with suitable means to restrain the trolley wheel from jumping the trolley wire and to retain said wheel in its operative traveling contact with the wire, irrespective of the variations or inaccuracies in the line construction.

My invention therefore consists in the arrangement and combination, with the usual form of trolley arm, of a bracket connected therewith, having a vertically arranged support and a trolley carrier pivotally arranged in said support and having a lateral movement.

Furthermore, the invention consists in the novel arrangement and combinations of said parts, and suitable spiral springs connected therewith, whereby the trolley wheel can travel along the bottom of the trolley wire, but has sufficient side movement to maintain, at all times, its operative contact with the imperfect alignment of the wire.

My invention is illustrated in the accompanying sheet of drawings, in which—

Figure 1:
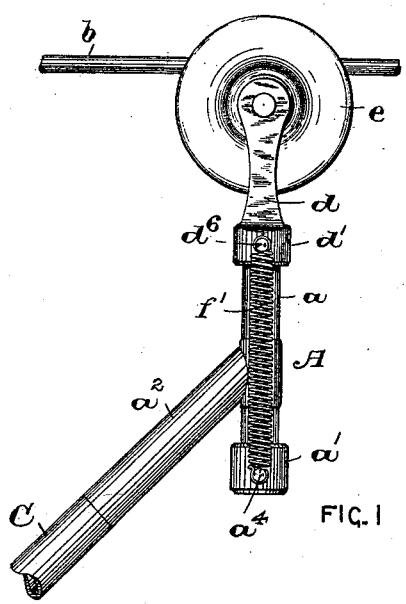
Figure 2:
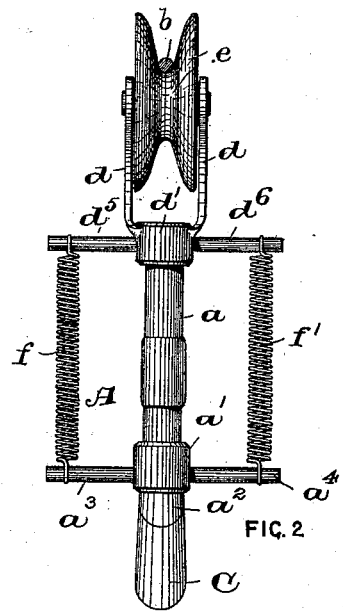
Figure 3:
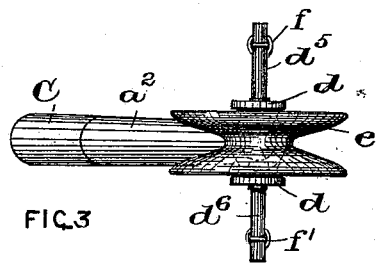
Figure 4:
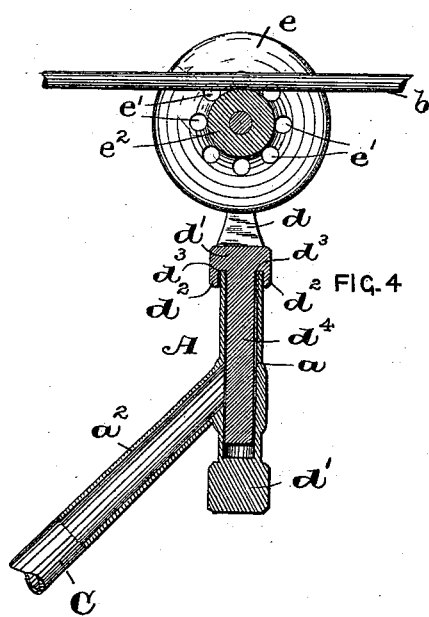
Figure 5:
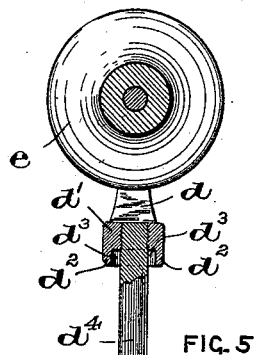

Figure 1 is a side elevation of the trolley embodying the principles of my invention. Fig. 2 is an end view, and Fig. 3 is a top view, of the same. Fig. 4 is a longitudinal vertical section of the trolley, clearly illustrating the arrangement and construction of the bracket on the trolley-arm, its vertically-arranged socket, and the forked trolley-wheel bearing provided with a pivotal support for rotatively arranging said parts in the socket. Fig. 5 is a similar view of the trolley-wheel and its forked bearing, having a pivotal support of a slightly-modified form of construction.

Similar letters of reference are employed in each of the above described views to indicate corresponding parts.

In said drawings, C indicates the trolley arm of the usual form of construction, and $b$ is the trolley wire. Secured to the upper end of the said trolley arm C is the bracket A, embodying the main features of my invention. Said bracket consists, essentially, of a vertically arranged tubular post $a$, which may be closed in the lower end, as at $a'$, or may be left open, if desired. Extending downwardly from one side of said tubular post $a$ at an angle of about forty five degrees, or approximately so, is a hollow arm $a^2$, which is slipped over the free end of the trolley arm C and is secured thereon in any well known manner. The upper end of said tubular post $a$ is left open, as will be clearly seen from Fig. 4, and arranged upon the surrounding upper edge of said post $a$ is the main body $d'$ of the forked bearing $d$ for the trolley wheel $e$. Said body $d'$ is provided on its under side with an annular flange $d^2$ forming an annular groove $d^3$. Said body portion is also provided with a downwardly extending pivotal pin $d^4$, which is formed integral with said body, as clearly shown in said Fig. 4, or may be made separate therefrom, being screwed or riveted in a hole in said body, as will be understood from an inspection of Fig. 5. Said pin $d^4$ is made to extend down into said tubular post $a$ and the recess of groove $d^3$ rests on the top of said post, while the annular flange $d^2$ prevents any displacement of said parts. Thus it will be seen, that these parts and the trolley wheel in its forked bearing are rotatively arranged on the top of the tubular post $a$. This arrangement allows of a lateral movement of the trolley wheel and its forked bearing, and electrical traveling contact of the wheel with the wire is maintained at all times, no matter what difficulties may be encountered arising from the imperfect alignment of the wire with the track, especially when passing around curves, or at cross-overs.

As will be seen from Figs. 1, 2 and 3, extending on opposite sides of the lower end $a'$ of the tubular post $a$ are suitable arms $a^3$ and $a^4$, and the body $d'$ of the trolley wheel bearing or carrier $d$ is provided with correspondingly arranged arms $d^5$ and $d^6$. The free ends of said arms $a^3$ and $d^5$, and $a^4$ and $d^6$ are respectively connected by suitable tension springs $f$ and $f'$, the purpose of which is to normally maintain the said arms $d^5$ and $d^6$ in line directly above said arms $a^3$ and $a^4$, in the same vertical plane passing through their central longitudinal axes; and when the upper parts of the bracket have been partially rotated on the tubular support $a$, owing to the trolley wheel following the imperfect alignment of the trolley wire, then the torsional strain on said springs will tend to maintain said wheel $e$ in its operative traveling contact with the wire, as will be clearly evident. These springs $f$ and $f'$ also serve the purpose of normally retaining the trolley wheel in line directly above the angularly arranged arm $a^2$, so that, when the operator desires to place the trolley wheel in operative traveling contact with the wire $b$, said wheel will not turn on its pivotal supporting pin $d^4$, and will be in the proper position to assist the operator in bringing it in contact with the wire.

As will be seen from Fig. 4, the trolley wheel $e$ may be provided with suitable holes or perforations $e'$, arranged concentric with the solid part $e^2$ of the wheel. The said holes, as the wheel travels along the wire, come in contact with the sides of said wire $b$, thereby serving to crack and remove any ice that may have formed on the wire in winter.

By my improvement, I have devised a simply constructed and effectively working trolley, which will turn laterally on its pivotal support while traveling along the imperfectly strung wire, irrespective of any variations or inaccuracies in the construction of the line.

Having thus described my invention, what I claim is—

1. In a trolley for electric cars, a trolley arm, having a vertically arranged support, and a trolley carrier pivotally arranged on said support said support and trolley carrier having oppositely projecting arms, and means connecting said arms, to maintain the said arms on the support in line directly above the said arms on the trolley carrier, and having a lateral movement, substantially as and for the purposes set forth.

2. In a trolley for electric cars, a trolley arm, a bracket connected with said arm, comprising therein a tubular post $a$ and an arm $a^2$, and a trolley carrier pivotally arranged on said tubular post said post and trolley carrier having oppositely projecting arms, and means connecting said arms, to maintain the said arms on the post in line directly above the said arms on the trolley carrier, and having a lateral movement, substantially as and for the purposes set forth.

3. The herein described trolley device, comprising therein, a tubular post $a$ and an arm $a^2$, oppositely projecting arms $a^3$ and $a^4$ on said post $a$, a trolley carrier pivotally arranged on said post $a$, oppositely extending arms $d^5$ and $d^6$ on said carrier, and springs $f$ and $f'$, all arranged, substantially as and for the purposes set forth.

4. The herein described trolley device, comprising therein, a tubular post $a$ and an arm $a^2$, oppositely projecting arms $a^3$ and $a^4$ on said post $a$, a trolley carrier, consisting, of a body portion $d'$ pivotally arranged on said tubular post $a$, a forked bearing $d$ thereon, having a trolley wheel, oppositely extending arms $d^5$ and $d^6$ on said body portion $d'$, and springs $f$ and $f'$, all arranged, substantially as and for the purposes set forth.

5. The herein described trolley device, comprising therein, a tubular post $a$ and an arm $a^2$, oppositely projecting arms $a^3$ and $a^4$ on said post $a$, a trolley carrier, consisting, of a body-portion $d'$, having an annular shoulder or flange $d^2$, and a recess or groove $d^3$, a downwardly extending pin $d^4$ rotatively arranged in said tubular post $a$, a forked bearing $d$, having a trolley wheel, oppositely extending arms $d^5$ and $d^6$ on said body portion $d'$, and springs $f$ and $f'$, all arranged, substantially as and for the purposes set forth.

In testimony that I claim the invention set forth above I have hereunto set my hand this 17th day of January, 1895.

JOHN W. HOAG.

Witnesses:
FREDK. C. FRAENTZEL,
WM. H. CAMFIELD, Jr.